June 6, 1933.  W. S. SMITH ET AL  1,912,548
SUBMARINE CABLE
Filed Nov. 28, 1928
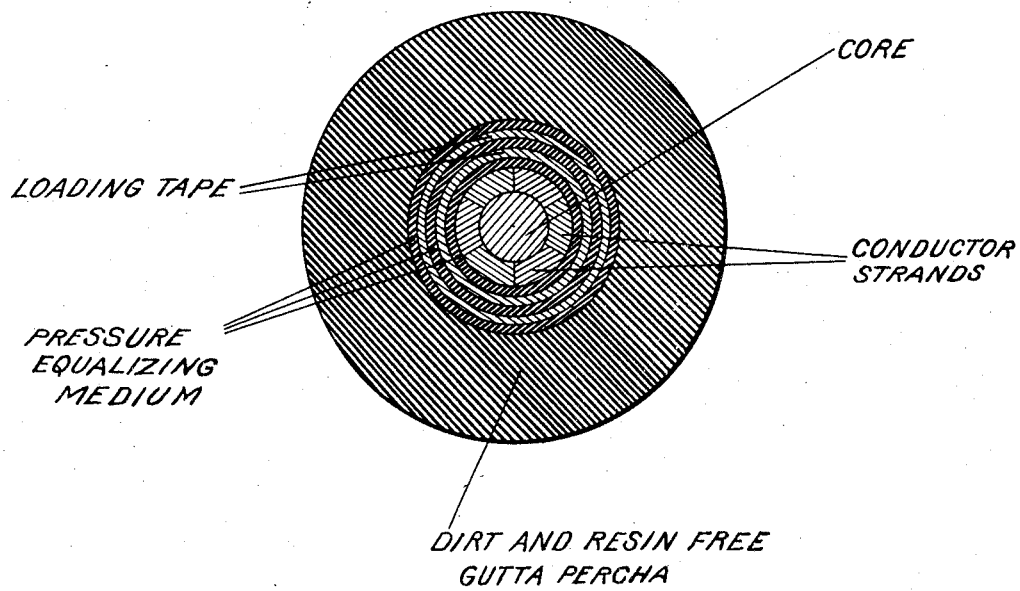
Willoughby S. Smith,
Henry J. Garnett    Inventors.
and Henry C. Channon,
By Baldwin & Wight
Attorneys.

Patented June 6, 1933

1,912,548

UNITED STATES PATENT OFFICE

WILLOUGHBY STATHAM SMITH, OF BENCHAMS, NEWTON POPPLEFORD, HENRY JOSEPH GARNETT, OF SOLEFIELDS, SEVENOAKS, AND HENRY CHARLES CHANNON, OF LONDON, ENGLAND

SUBMARINE CABLE

Application filed November 28, 1928, Serial No. 322,572, and in Great Britain September 2, 1927.

This invention relates to electrical insulating materials containing gutta percha, balata or allied gums and has for its object the manufacture of material suitable in particular for insulating the conductors of submarine signalling cables, especially in those cases where low alternating current leakance of the dielectric material is an important consideration.

More particularly the invention relates to the manufacture of a material for insulating the conductors of submarine telephone cables. This application is a continuation in part of our formerly copending application Serial No. 303,970, filed September 4, 1928, which has matured into Patent 1,819,720, issued August 18, 1931.

The use of gutta percha as the electrical insulating medium for submarine telegraph conductors is well known. Its thermoplastic nature and the ease with which it may be extruded in the plastic condition around the conductor, its mechanical and electrical properties, its resistance to the action of water and the ease with which a sound joint may be made render it eminently suitable for this purpose.

Raw gutta percha is met with in commerce in a large number of different qualities, which have to be purified before they are suitable for use as the insulating material of submarine signalling conductors. Although the number of chemically different substances in raw gutta percha is very large, they are generally analytically divided by those engaged in the technical treatment of this material into four groups, namely:— gutta hydrocarbon, resins, dirt and moisture. The gutta hydrocarbon is the valuable thermoplastic material; the resins comprise the resinous fraction, consisting undoubtedly of a large number of different substances, extractable from the raw gutta percha by means of suitable solvents e. g. cold petroleum spirit, while under dirt are included not only adventitious impurities such as sand and earth or fragments of bark off the tree, but also all those substances, such as proteins and sugars, derived from the latex and not classed as hydrocarbon or resin. When these terms are used in the course of this specification, they should be understood to refer to these fractions of the raw gutta percha.

It has long been known that, for the insulation of submarine telegraph cables, it is necessary to remove the greater part of the dirt from the gutta percha. On the other hand, the gutta percha is not deprived of its resins, but an insulating material having the desired properties is obtained by mixing gutta percha of different qualities in suitable proportions.

An insulating material prepared in this way generally has a rather high dielectric constant and a high alternating current leakance. For submarine signalling cables, whether for the transmission of telegraphy or telephony it is desirable that the insulating material should have as low a dielectric constant as possible. As regards the leakance, although a high value for this property of the insulating material is no great disadvantage in the case of unloaded submarine telegraph cables, where the frequency of the signalling current is very low, it is undesirable for a loaded submarine telegraph cable, where the frequency of the signalling current is much higher, while for the efficient operation of a cable carrying currents of audio-frequency or even higher, it is essential that the leakance of the insulating material at the temperatures met with in ocean depths should be as low as possible at the frequencies concerned.

An undesirable property of the gutta percha prepared as above is that its leakance increases as the temperature falls, so that when it is cooled at 32° F., which is approximately the temperature of the water in the deeper parts of the oceans, the leakance usually rises to a value far higher than that shown by the material at ordinary temperatures.

One of the objects of the present invention is to provide a material having a very low dielectric constant and a very low leakance.

Observations made with a very large number of different mixings have shown that the rather high dielectric constant and leakance of gutta percha can be considerably reduced by removing the dirt very completely. This may be partly accomplished by prolonged washing in suitable machines well known to the art. This process, however, is expensive and yields an uncertain result.

According to the present invention the gutta percha and/or balata and/or allied gums is treated by dissolution in a suitable solvent such as benzene or petroleum spirit and the impurities removed by sedimentation and decantation, or by filtration, if necessary in the presence of aids to these processes. It has been found that more rapid and efficient filtration of the solution is obtained by adding a predetermined quantity of a fine clay to serve as a filter-aid and filtering the solution through e. g. a suitable filter-cloth that has preferably first received an initial coating of the same filter aid. The filtered solution should be perfectly clear and transparent. The purified gum is recovered by e. g. evaporation of the solvent by steam distillation or by freezing out. When freed from the solvent, the treated gum is removed and dried by sheeting and hanging up in the air or by treatment in a vacuum masticator or some other means known to the art. Thus in accordance with the present invention the gutta percha material is rendered substantially free from dirt including impurities derived from the latex which would not be removed by the prolonged washing process previously used in the preparation of gutta percha insulating material.

It has also been found that the high temperature coefficient of the leakance is due mainly to the presence of certain resins in the gutta percha insulating material and that if these resins are removed, it materially assists to produce a material having a very low temperature coefficient of the leakance and also a low dielectric constant.

The gutta percha or other gum or gums in accordance with a further feature of the invention therefore is treated, preferably prior to the operation of removing the dirt, with a solvent to extract the resins. It may be found that in some cases a satisfactory product is obtained if only a part of the material is treated to remove the resins. Samples of gutta percha, treated in the way described above to remove the dirt and the undesirable resins have a dielectric constant of about 2.6 and a leakance of under 2 micro-micromhos per centimetre cube at 1000 cycles and at 75° F. and a leakance of 6 micro-micromhos per centimetre cube at 2000 cycles and at 32° F., compared with the corresponding values of 3.3 and up to 10 and 100 usually found for the same properties respectively of ordinary gutta percha submarine cable insulation.

It has also been found that in certain cases, solution and filtration are not absolutely necessary. In these cases, if the undesirable resins are first removed and the material exhaustively washed to remove practically the whole of the dirt, the resultant material is satisfactory for those purposes where the lowest values for dielectric constant and leakance are not necessary.

The improvement in the electrical properties of the gutta percha as a result of the treatment described above will be seen from the following table:—

| | Temperature | Leakance mhos per cm | | Dielectric constant |
| --- | --- | --- | --- | --- |
| | | 1,000 cycles | 2,000 cycles | |
| Ordinary gutta percha submarine cable insulation | 75° F. | 9 | 25 | 3.3 |
| | 32° F. | 40 | 97 | |
| The same, but with dirt removed | 75° F. | 2 | 5 | 2.9 |
| | 32° F. | 26 | 62 | |
| The same, but with dirt and resin removed | 75° F. | 1.3 | 3.3 | 2.6 |
| | 32° F. | 1.9 | 5.9 | |

It has been found that the variation of the dielectric constant with temperature and frequency is very slight over the ranges stated above and in the above table this constant has been averaged for the sake of simplicity.

It is desirable, though not always necessary, to add a small quantity of some suitable antioxidant, such as tannin, to replace the natural preservatives which are removed from the gums in the course of the treatment. It has been found that the antioxidant can be added in an amount to be efficient and yet without seriously affecting the desirable electrical properties of the material.

When completely immersed in water, the purified gutta percha shows substantially no increase in weight in the first few weeks of immersion, whereas ordinary gutta percha insulating material shows an increase in weight of 1% or even more in this time. When the period of immersion of the purified gutta percha is prolonged, the rate at which the weight increases generally becomes greater, often rather suddenly. This phenomenon has been shown to be due to the oxidation of the gutta percha in the absence of the natural preservative. When a small amount of a suitable preservative is added to the purified gutta percha, the rate at which the weight increases is increased slightly in the early period of immersion, but is still well below that for ordinary gutta percha submarine cable insulation, and moreover the somewhat sudden rise in the rate of weight-increase, shown in the absence of preservative, is no longer evidenced.

The tendency of the gutta percha to absorb water has therefore been greatly reduced by the removal of practically the whole of the water-soluble impurities as dirt and by the addition of a small amount of an artificial preservative. The absorption of water by gutta percha always has a markedly bad effect upon the dielectric properties of the latter. The purified gutta percha therefore shows the additional advantage, when used for insulating the conductors of submarine cables, that its dielectric properties are not liable to change due to the gradual absorption of water.

It is not possible to state what are the characteristics of the qualities of the raw gutta percha which, after the removal of some or all of its resin and the whole of the dirt, will yield a material of specially low leakance and dielectric constant. The particular composition of the mixture of gums to be used must be determined by reference to curves connecting leakance and other dielectrical properties, such as dielectric constant, with composition. It has been found, however, that in most cases, the lowest results for the dielectric constant and often for leakance are obtained only when all the resin has been removed.

Gutta percha obtained as a result of one of the treatments described above is particularly suitable for use as a component in the electric insulating materials described in the copending U. S. application Serial No. 383,416, filed August 3, 1929, or for admixture with synthetic rubber or with rubber preferably treated as described in the copending U. S. application No. 374,948, filed June 29, 1929, or for use as a composite layered dielectric with one or more of the above.

A representative form of signaling conductor embodying the invention is illustrated in the accompanying drawing with explanatory legends applied thereto.

In this specification, the words gutta percha have been used in a generic sense and must be understood to include not only the many varieties of true gutta percha, but also balata and other allied gums, or mixtures of one or more of all these.

Any liquid medium may be employed for the solvent in which, if necessary on warming, the resins and the hydrocarbons of the thermoplastic material are freely soluble, but in which the "dirt" constituents, are substantially insoluble and from which the hydrocarbon can be recovered substantially unchanged physically and chemically. That is to say, the solvent should not prejudicially change the state of aggregation of the gutta, for instance, nor should the solvent, nor any impurities with which it may be contaminated act chemically upon the hydrocarbon.

Warm petroleum spirit dissolves the gutta hydrocarbon and the resins, but not the "dirt". As the gutta hydrocarbon is almost insoluble in cold petroleum spirit, it separates out (commonly known as freezing out) as the solution cools, leaving the resins in solution.

In the accompanying claims the term "gutta percha" is used in a general sense and is intended to include gutta percha and/or balata and/or allied gums.

What we claim is:—

1. The combination with a signalling conductor, of insulating material applied thereto and comprising purified gutta percha substantially free from resin and dirt including the impurities derived from the latex and sap removable only by dissolution of the gutta hydrocarbon in a solvent and mechanical separation of said impurities from the solution and not removably by prolonged washing, said insulating material having a low leakance of under 2-micro-micromhos per centimetre cube at 1000 cycles and at 75° F., and a corresponding leakance of under about 6-micro-micromhos at 2000 and 32° F.

2. The combination with a signalling conductor, of insulating material applied thereto and comprising purified gutta percha substantially free from resin and dirt including the impurities derived from the latex and sap removable only by dissolution of the gutta hydrocarbon in a solvent and mechanical separation of said impurities from the solution and not removable by prolonged washing, and an anti-oxident such as tannin admixed with said gutta percha, said insulating material having a low leakance of under 2-micro-mircomhos per centimetre cube at 1000 cycles and at 75° F., and a corresponding leakance of under about 6-micro-micromhos at 2000 and 32° F.

3. In a submarine signaling conductor the combination of a core and insulating material applied thereto and comprising gutta percha, from which has been removed substantially the whole of the resins and the dirt including the impurities derived from the latex removable only by dissolution of the gutta hydrocarbon in a solvent and mechanical separation of said impurities from the solution and not removable by prolonged washing, admixed with a plasticizing insulating material.

4. In a submarine signalling conductor the combination of a core and insulating material applied thereto and comprising gutta percha, from which has been removed substantially the whole of the resins and the dirt including the impurities derived from the latex removable only by dissolution of the gutta hydrocarbon in a solvent and mechanical separation of said impurities from the solution and not removable by prolonged washing, admixed with rubber.

5. In a submarine signalling conductor the combination of a core and insulating material applied thereto and comprising gutta percha, from which has been removed substantially the whole of the resins and the dirt including the impurities derived from the latex removable only by dissolution of the gutta hydrocarbon in a solvent and mechanical separation of said impurities from the solution and not removable by prolonged washing, admixed with substantially dirt free rubber.

In testimony that we claim the foregoing as our invention we have signed our names this fifteenth day of November 1928.

WILLOUGHBY STATHAM SMITH.
HENRY JOSEPH GARNETT.
HENRY CHARLES CHANNON.